United States Patent
Srinivasagam et al.

(10) Patent No.: US 7,080,222 B1
(45) Date of Patent: Jul. 18, 2006

(54) CELLULAR TELEPHONE MEMORY WITH BACKUP MEMORY INTERFACE

(75) Inventors: Kannan Srinivasagam, Sunnyvale, CA (US); Rajesh Manapat, San Jose, CA (US); Mario Martinez, Los Gatos, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 135 days.

(21) Appl. No.: 10/251,623

(22) Filed: Sep. 20, 2002

(51) Int. Cl.
 *G06F 12/00* (2006.01)
(52) U.S. Cl. ........................... 711/162; 711/104
(58) Field of Classification Search ............ 711/162, 711/165, 103–105, 1, 2, 154, 161, 5, 101, 711/149
 See application file for complete search history.

(56) References Cited

U.S. PATENT DOCUMENTS

| | | | | |
|---|---|---|---|---|
| 5,680,570 A | * | 10/1997 | Rantala et al. | 711/113 |
| 5,887,145 A | * | 3/1999 | Harari et al. | 710/301 |
| 6,366,977 B1 | * | 4/2002 | Mizoguchi | 711/103 |
| 6,418,506 B1 | * | 7/2002 | Pashley et al. | 711/103 |
| 6,438,668 B1 | * | 8/2002 | Esfahani et al. | 711/165 |
| 6,563,746 B1 | * | 5/2003 | Fujioka et al. | 365/189.09 |
| 6,625,687 B1 | * | 9/2003 | Halbert et al. | 711/105 |

\* cited by examiner

*Primary Examiner*—Hong Chong Kim
*Assistant Examiner*—Shane M. Thomas
(74) *Attorney, Agent, or Firm*—Marger Johnson & McCollom, P.C.

(57) ABSTRACT

A static random-access memory (SRAM) provides volatile storage of data in a cellular telephone. Connected to the volatile SRAM is a second SRAM that provides nonvolatile storage of data by backup battery means. Writing and reading of either volatile or nonvolatile data can occur. Additionally, provision is made to automatically back up data written to the volatile SRAM in the nonvolatile SRAM, as well as to streamline restoration of backed-up data from the nonvolatile SRAM to the volatile SRAM.

26 Claims, 3 Drawing Sheets

CELLULAR TELEPHONE MEMORY WITH BACKUP MEMORY INTERFACE

FIELD OF THE INVENTION

The present invention relates to a method and apparatus for storing information in cellular telephones, and more particularly to a method and apparatus for facilitating information backup.

BACKGROUND OF THE INVENTION

A cellular telephone is commonly implemented using a processor to perform control functions, with the processor having associated volatile static random-access memory (VSRAM) as well as nonvolatile static random-access memory (NVSRAM) that provides backup storage for the VSRAM.

The VSRAM is a high-performance, high-density memory used for storage of code, temporary data and downloaded data, and optionally for running the processor's operating system and application programs.

The NVSRAM is a lower-density memory used only for the backup of data from the processor, and achieves non-volatility by backup battery means.

The control, address and data signals that connect the VSRAM and the processor are also utilized to connect the NVSRAM and the processor.

The processor is able to: store data in the VSRAM; store data in the NVSRAM; retrieve data from the VSRAM; and retrieve data from the NVSRAM.

In order to ensure that a nonvolatile copy of data written to the VSRAM is preserved in the NVSRAM, the processor must write the data to the VSRAM and also write the data once again to the NVSRAM.

In order to restore a datum from the NVSRAM to the VSRAM, the processor must read the datum from the NVSRAM and then write it to the VSRAM.

The performance of the processor could be improved if a means were available to allow the processor to write data to the VSRAM and have the data be written to the NVSRAM automatically without incurring the overhead of the additional time required to perform the backup-write memory access.

The performance of the processor could also be improved if a means were available to allow the processor to issue a single memory request that would restore a datum from the NVSRAM to the VSRAM automatically without incurring the overhead of the additional time required to perform the restore-write memory access.

SUMMARY OF THE INVENTION

In the present invention the NVSRAM is interfaced to the VSRAM rather than to the processor. Memory access requests issued by the processor are addressed to and responded to by the VSRAM. This allows writes and reads involving volatile data present in the VSRAM to be handled in a manner similar to that as done in conventional implementations. It also allows for automatic backup of data written to volatile memory to be performed, as the VSRAM can pass processor write requests to the NVSRAM to have the data written to nonvolatile memory at the same time as it is being written to volatile memory by the VSRAM. It further allows for streamlined restoration of data stored in nonvolatile memory back to volatile memory, as the VSRAM can pass processor read requests to the NVSRAM to have data be read from nonvolatile memory and at the same time be written to volatile memory by the VSRAM.

DETAILED DESCRIPTION

Figure 1:
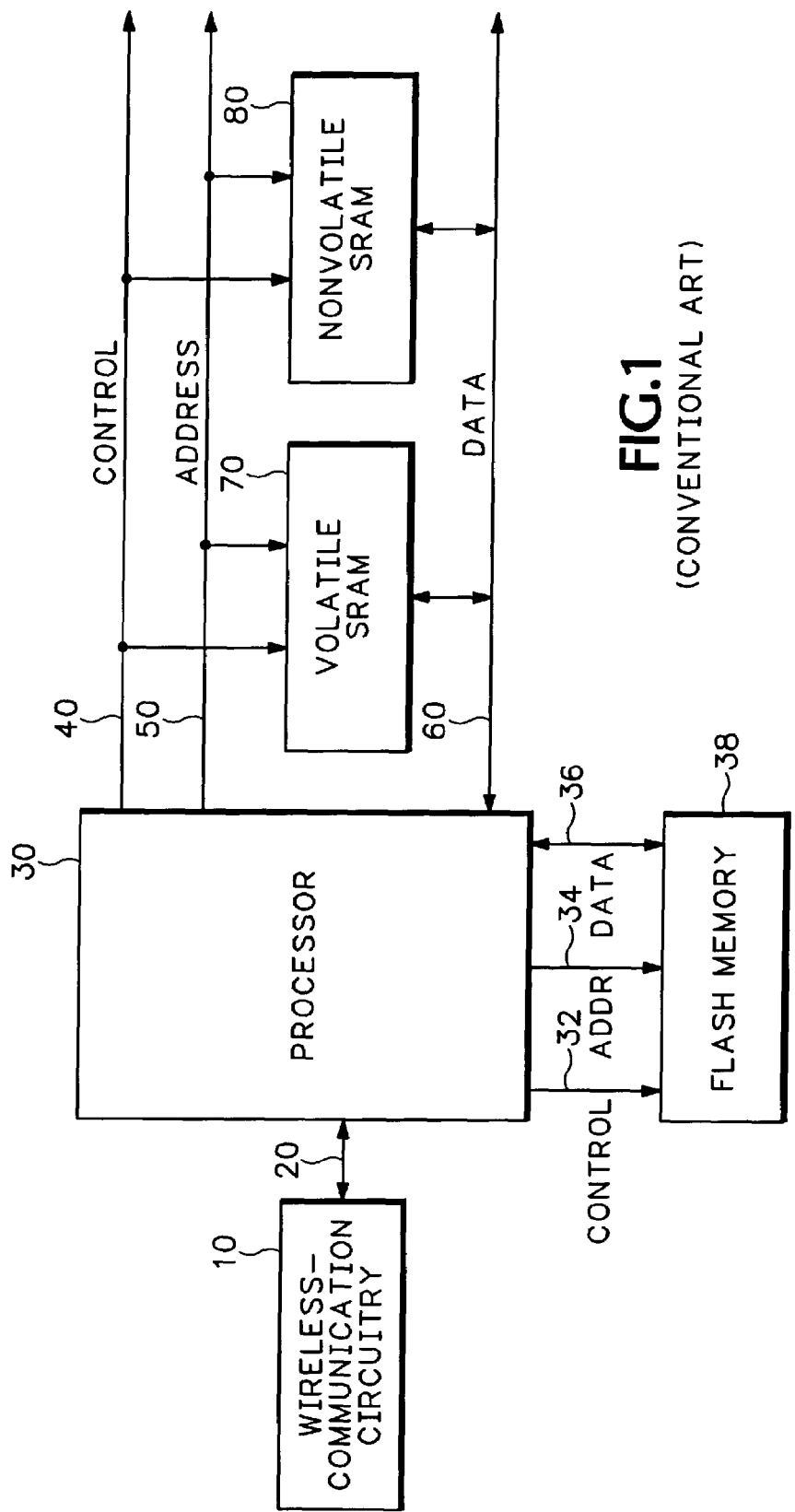
FIG. 1 is a block diagram of a cellular telephone that contains a processor and associated flash and SRAM memories. The processor utilizes a common set of control, address and data signals to communicate with the volatile and nonvolatile SRAMs, as is conventional.

A conventionally-implemented cellular telephone is shown in FIG. 1. Wireless-communication circuitry 10 sends and receives signals via an antenna (not shown in the figure). Processor 30 communicates with circuitry 10 via a first signal path comprising signals 20. Processor 30 communicates with flash memory 38 via a second signal path comprising control signals 32, address signals 34 and data signals 36. Processor 30 also communicates with volatile SRAM (VSRAM) 70 and nonvolatile SRAM (NVSRAM) 80 via a third signal path comprising control signals 40, address signals 50 and data signals 60.

Writing to and reading from NVSRAM 80 occur separately and independently from writing to and reading from VSRAM 70. Ensuring that a nonvolatile copy of data written to VSRAM 70 is preserved in NVSRAM 80 requires processor 30 to write the data to VSRAM 70 and also to write the data once again to NVSRAM 80. Similarly, restoring a datum from NVSRAM 80 to VSRAM 70 requires processor 30 to first read the datum from NVSRAM 80 and then to write it to VSRAM 70.

Figure 2:
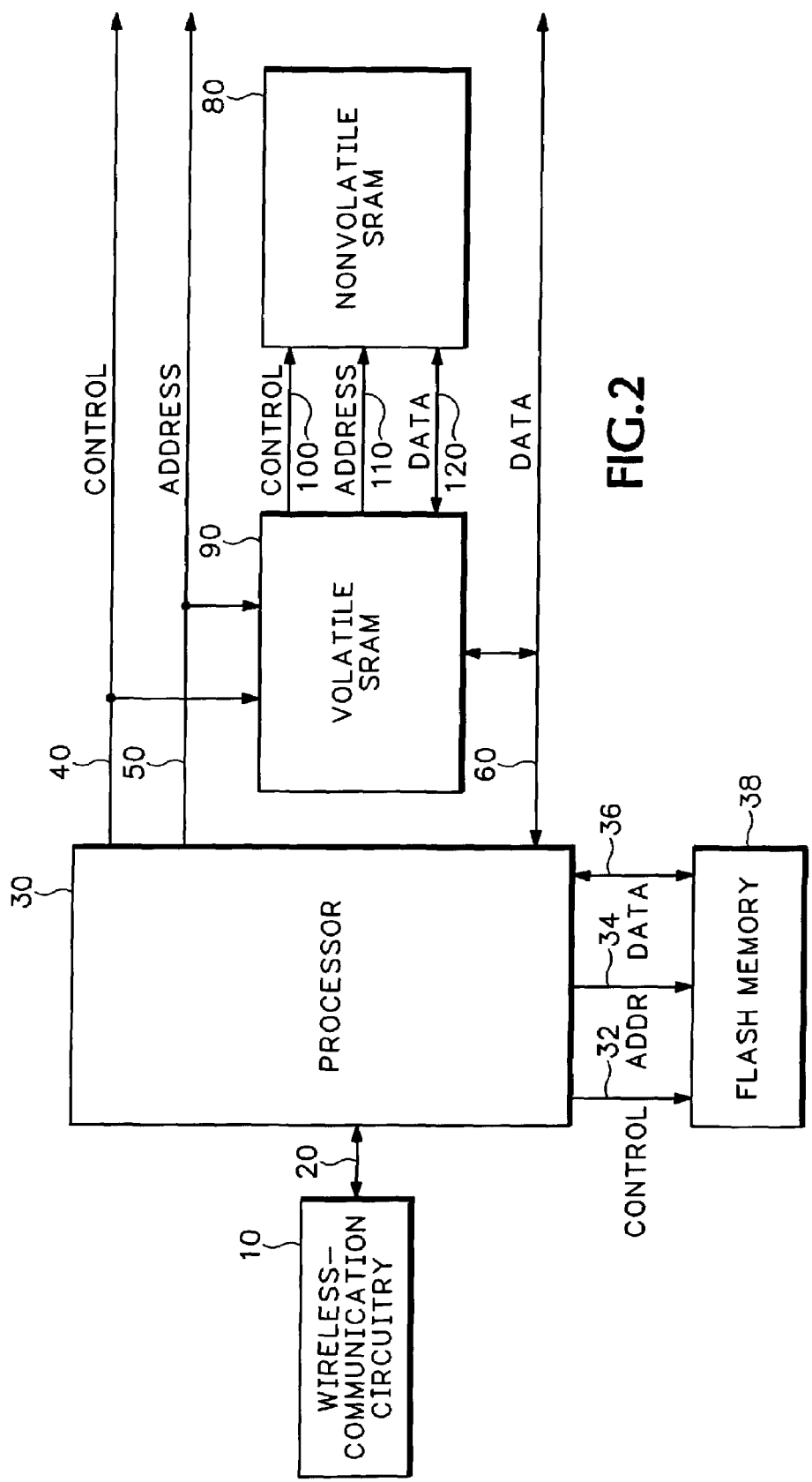
FIG. 2 is a block diagram of a cellular telephone with a processor that communicates with the volatile SRAM directly, and that communicates with the nonvolatile SRAM indirectly via the volatile SRAM, in accordance with the invention.

A cellular telephone implemented in accord with the teachings of the present invention is shown in FIG. 2. VSRAM 90 receives the signals of the processor via a first signal path and implements a second signal path via which a set of control signals 100, address signals 110 and data signals 120 are communicated to NVSRAM 80. NVSRAM 80, rather than receiving its control, address and data information from processor 30 and supplying read data back to processor 30 as was the case in FIG. 1, instead receives its control, address and data information from VSRAM 90 and supplies read data back to VSRAM 90.

Writing volatile data to and reading volatile data from VSRAM 90 occur in a manner essentially the same as is the case for the configuration of FIG. 1. Writing nonvolatile data to and reading nonvolatile data from NVSRAM 80 require that processor 30 issue memory access requests addressed to and responded to by VSRAM 90.

The control logic of VSRAM 90 facilitates automatic backup of data to nonvolatile memory by responding to a specific type of access request issued by processor 30 wherein write data of the processor is written into the volatile memory of VSRAM 90 at the address specified by the memory address information issued by processor 30, and is also at the same time passed on along with related control and address information to NVSRAM 80 where the data is stored nonvolatilely at the address specified by the memory address information issued by processor 30 as relayed by VSRAM 90.

The control logic of VSRAM 90 facilitates streamlined retrieval of data from nonvolatile memory by responding to another specific type of access request issued by processor 30 wherein a read is performed of NVSRAM 80 to obtain data as specified by the memory address information issued by processor 30 as relayed by VSRAM 90, with the read data then being written into the volatile memory of VSRAM 90 at the address specified by the memory address information issued by processor 30.

Figure 3:
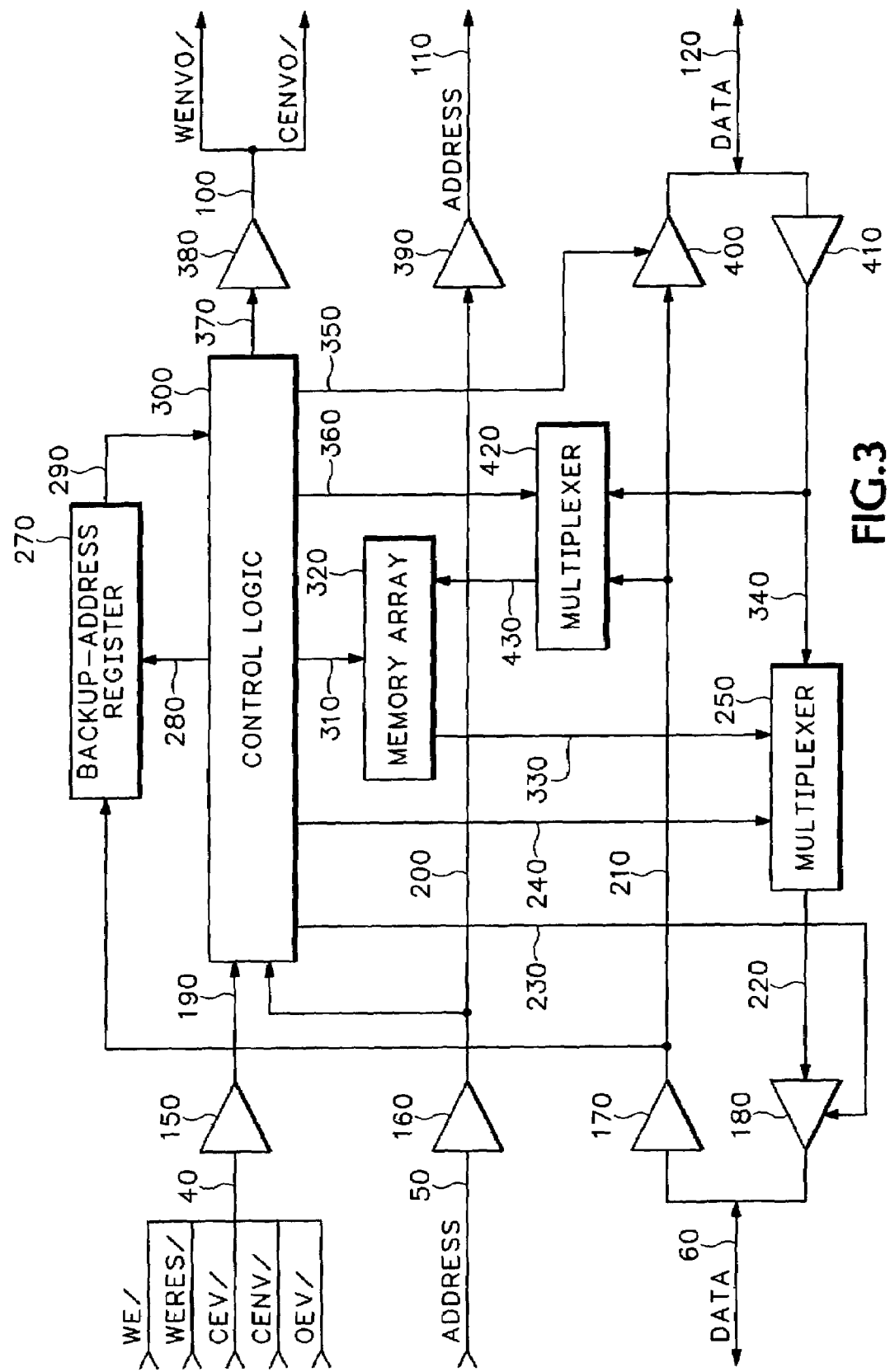
FIG. 3 is a block diagram of the volatile SRAM shown in FIG. 2.

VSRAM 90 is shown in more detail in FIG. 3. Control, address and data information is communicated from and to processor 30 (FIG. 2) via signals 40, 50 and 60, which constitute a first signal path of the unit. Control, address and data information is communicated to and from NVSRAM 80 (FIG. 2) via signals 100, 110 and 120, which constitute a second signal path of the unit.

Buffers 150, 160 and 170 make the processor control, address and write data information available for use in the unit via signals 190, 200 and 210. Three-state buffer 180 outputs read data to processor 30 (FIG. 2). Control logic 300 functions utilizing control and address signals 190 and 200 as inputs, and controls memory array 320 via control signals 310.

Control logic 300 also controls read data three-state output buffer 180 via control signal 230 and controls production of output read data on signals 220 from multiplexer 250 via control signal 240. Multiplexer 250 allows the unit to select either data read from memory array 320 and present on signals 330 or data input from NVSRAM 80 (FIG. 2) and present on signals 340.

Associated with control logic 300 is backup-address register 270 that can be loaded with the write data from processor 30 (FIG. 2) that is present on signals 210, under control of load-enable signal 280. The value of register 270 is provided to control logic 300 via signals 290.

Control logic 300 controls selection of data to be written to memory array 320 present on signals 430 via multiplexer 420 and its control signal 360. Multiplexer 420 selects either write data input from processor 30 (FIG. 2) and present on signals 210 or read data input from NVSRAM 80 (FIG. 2) and present on signals 340.

Control logic 300 also produces control signals 370 for output via buffer 380 to NVSRAM 80 (FIG. 2) via signals 100. Buffer 390 provides address information present on signals 200 out to NVSRAM 80 (FIG. 2) via signals 110.

Control logic 300 controls the functioning of three-state output buffer 400 via control signal 350, with buffer 400 outputting write data to NVSRAM 80 (FIG. 2) via signals 120. Buffer 410 makes read data from NVSRAM 80 (FIG. 2) available for use on signals 340.

In the preferred embodiment of the invention, five control signals are provided for within the input control signals 40, two control signals are provided for within the output control signals 100, twenty-five address signals are provided for within signals 50 and 110 each (thereby permitting addressing of up to 32M data items), and sixteen data signals are provided for within signals 60 and 120 each.

The five input control signals 40 of the preferred embodiment of the invention are identified as WE/, WEres/, CEv/, CEnv/ and OEv/, where "WE" in the signal names signifies "write enable", "/" signifies assertion when the signal is electrically low, "res" signifies "restore", "CE" signifies "chip enable", "v" signifies "volatile", "nv" signifies "nonvolatile", and "OE" signifies "output enable".

The two output control signals 100 of the preferred embodiment of the invention are identified as WEnvo/ and CEnvo/, where "nvo" in the signal names signifies "nonvolatile output".

VSRAM 90 (FIG. 2) can be commanded by processor 30 (FIG. 2) to perform six data storage/retrieval functions, which VSRAM 90 (FIG. 2) carries out by itself or in conjunction with NVSRAM 80 (FIG. 2). These functions are: writing data to VSRAM (function #1); writing data to NVSRAM (function #2); writing data to VSRAM and also conditionally to NVSRAM (referred to as data backup (function #3)); reading data from VSRAM (function #4); reading data from NVSRAM (function #5); reading data from NVSRAM and writing the data to VSRAM (referred to as data restoration (function #6)).

Function #1 is carried out when input control signals WE/, WEres/, CEv/ and CEnv/ are respectively true, false, false and true. Output control signals WEnvo/ and CEnvo/ are then true and false respectively.

Function #2 is carried out when input control signals WE/, WEres/, CEv/ and CEnv/ are respectively true, false, true and false. Output control signals WEnvo/ and CEnvo/ are then both true.

Function #3 is carried out when input control signals WE/, WEres/, CEv/ and CEnv/ are respectively true, false, true and true. Output control signals WEnvo/ and CEnvo/ are then both true when writing to NVSRAM is to occur, otherwise they are false and true respectively.

Function #4 is carried out when input control signals WE/, WEres/, CEv/ and CEnv/ are respectively false, false, false and true, with read data enabled for output on signals 60 when signal OEv/ is true. Output control signals WEnvo/ and CEnvo/ are then both false.

Function #5 is carried out when input control signals WE/, WEres/, CEv/ and CEnv/ are respectively false, false, true and false, with read data enabled for output on signals 60 when signal OEv/ is true. Output control signals WEnvo/ and CEnvo/ are then false and true respectively.

Function #6 is carried out when input control signals WE/, WEres/, CEv/ and CEnv/ are respectively false, true, true and true. Output control signals WEnvo/ and CEnvo/ are then false and true respectively.

The storage of data in NVSRAM as carried out in the case of function #3 is conditional and is based upon the value of address signals 50 as compared with the value of backup-address register 270 by control logic 300. Control logic 300 decodes the most-significant bits (MSB's) of address signals 50 so that the memory address specified is identified as belonging to one of a number of sections of memory. In the preferred embodiment of the invention the upper three address bits are decoded to identify one of eight possible memory sections. Backup-address register 270 comprises one bit for each possible memory section. In the preferred embodiment of the invention, backup-address register 270 comprises eight bits. The storage of data in NVSRAM by function #3 is performed if the bit of backup-address register 270 associated with the decoded interpretation of the memory address present on signals 50 is true.

Control logic 300 causes backup-address register 270 to be loaded with write data present on signals 60 and 210 via control signal 280 when a specific value is recognized on address signals 50. In the preferred embodiment of the invention the loading of backup-address register 270 occurs when processor 30 (FIG. 2) requests that a function #1 write operation be performed with all address signals having a true value.

Control logic 300 causes memory array 320 via control signals 310 to perform a write in the case of functions #1, #3 and #6; a read is performed in the case of function #4.

Control logic 300 causes read data three-state output buffer 180 via control signal 230 to be enabled when input control signal OEv/ is true in the case of functions #4 and #5.

Control logic 300 causes read data multiplexer 250 via control signal 240 to select read data from memory array 320 present on signals 330 in the case of function #4, and to select read data present on signals 120 and 340 in the case of function #5.

Control logic 300 causes write data multiplexer 420 via control signal 360 to select write data present on signals 60 and 210 in the case of functions #1 and #3, and to select read data present on signals 120 and 340 in the case of function #6.

Control logic 300 causes write data three-state output buffer 400 via control signal 350 to be enabled in the case of functions #2 and #3.

It will be understood by those skilled in the art that variations on the above-described VSRAM implementation as shown in FIG. 3 and as described above are possible that fall within the scope of the present invention, including: a number and type of input control signals 40 different from the five described; a number and type of output control signals 100 different from the two described; a number of address signals 50 and 110 different from twenty-five; a number of data signals 60 and 120 different from sixteen. Other variations in circuit topology and device or functional partitioning may be made, also within the spirit and scope of the invention.

Having described and illustrated the principles of the invention in a preferred embodiment thereof, it should be apparent that the invention may be modified in arrangement and detail without departing from such principles. Claims are made to all modifications and variations coming within the spirit and scope of the following claims.

What is claimed is:

1. A memory device comprising:
   a memory array;
   a first signal path via which a first set of signals communicating memory address, write data, and control information are input to the memory device and via which a second set of signals communicating read data information are output from the memory device;
   a second signal path via which a third set of signals communicating the memory address, the write data, and the control information are output from the memory device without communicating through the memory array and via which a fourth set of signals communicating the read data information are input to the memory device without communicating through the memory array;
   a logic circuit for controlling data storage and retrieval to and from the memory array, wherein the logic circuit comprises:
      means for communicating to the memory array the memory address information that is input to the memory device;
      means for communicating via the second signal path the memory address information that is input to the memory device;
      means for communicating via the second path the write data that is input to the memory device;
      means for selecting a source of write data for the memory array from between the write data that is input to the memory device and the read data information that is input to the memory device;
      means for selecting a source of read data information, which is output from the memory device, from between the memory array and the read data information that is input to the memory device; and
      means for outputting a write-enable control signal via the second path;
   the memory array and logic circuit both integrated within the memory device and the first and second signal paths comprising external interfaces on the memory device, and data bits representing the memory address information are directly communicated from the first signal path to the second signal path without communicating through the logic circuit; and
   a backup-address register specifying a range of memory addresses for which assertion of the write-enable control signal occurs.

2. A memory device according to claim 1 further comprising means for enabling loading of the backup-address register based on the memory address information that is input, wherein the backup-address register is loaded with a value based on the write data information that is input.

3. A memory device according to claim 1 wherein the write data and read data information are communicated from the first signal path to the second signal path independently from the logic circuit.

4. A system for storing and retrieving data in volatile and nonvolatile form, the system comprising:
   a processor;
   a volatile memory unit having a memory array;
   a nonvolatile memory unit;
   a first signal path via which a first set of signals communicating memory address, write data, and control information are output by the processor to the volatile memory unit and via which a second set of signals communicating read data information are input to the processor from the volatile memory unit;
   a second signal path via which a third set of signals communicating memory address, write data, and control information are output by the volatile memory unit to the nonvolatile memory unit without communicating through the memory array, and via which a fourth set of signals communicating read data information are input to the volatile memory unit from the nonvolatile memory unit without communicating through the memory array; and
   an address control logic circuit integrated within the volatile memory unit used for controlling memory accesses to both the volatile memory unit and the nonvolatile memory unit, wherein data bits representing the memory address information are directly communicated from the first signal path to the second signal path without communicating through the address control logic circuit.

5. A system according to claim 4 wherein the system for storing and retrieving the data is implemented as part of a cellular telephone.

6. A system according to claim 4 wherein:
   the volatile memory unit contains means responsive to the signals of the first signal path for storing write data from the processor into the memory array;
   the volatile memory unit contains means responsive to the signals of the first signal path for storing write data from the processor to the nonvolatile memory unit;
   the volatile memory unit contains means responsive to the signals of the first signal path for storing write data from the processor concurrently into the memory array and to the nonvolatile memory unit;

the volatile memory unit contains means responsive to the signals of the first signal path for retrieving read data to the processor from the memory array;

the volatile memory unit contains means responsive to the signals of the first signal path for retrieving read data to the processor from the nonvolatile memory unit; and the volatile memory unit contains means responsive to the signals of the first signal path for retrieving read data from the nonvolatile memory unit and storing the data in the memory array.

7. A system according to claim 4 wherein only the first signal path exists from the processor to the volatile memory unit with no other memory address or data signal path connected from the processor to the nonvolatile memory unit.

8. A system according to claim 4 wherein the first signal path is connected in series between the processor and the volatile memory and the second signal path is connected in series between the volatile memory unit and the nonvolatile memory unit.

9. A system according to claim 8 wherein the processor conducts all communications accessing memory locations in the nonvolatile memory unit through the first signal path that connects the processor to the volatile memory unit.

10. A method for storing and retrieving data in volatile and nonvolatile memory units, the volatile memory unit having a memory array, comprising:

outputting via a first signal path a first set of signals communicating memory address, write data and control information from a processor to a volatile memory unit;

inputting via the first signal path a second set of signals communicating read data information to the processor from the volatile memory unit;

outputting via a second signal path a third set of signals communicating memory address, write data and control information from the volatile memory unit to a nonvolatile memory unit without communicating through the memory array;

inputting via the second signal path a fourth set of signals communicating read data information to the volatile memory unit from the nonvolatile memory unit without communicating through the memory array; and controlling data storage and retrieval to and from the memory units by a logic circuit that is integrated within the volatile memory unit, wherein data bits representing the memory address information are directly communicated from the first signal path to the second signal path without communicating through the logic circuit.

11. A method according to claim 10 including connecting the first signal path in series between the processor and the volatile memory unit and accessing both the volatile memory unit and the nonvolatile memory unit through the first signal path.

12. A method according to claim 11 including connecting the first signal path in series between the processor and the volatile memory unit and connecting the second signal path in series between the volatile memory unit and the nonvolatile memory unit.

13. A method according to claim 10 in which the storing comprises:

storing the write data information of the processor into the memory array of the volatile memory unit at a memory location based on the memory address information output by the processor; and storing the write data information of the processor into a memory array of the nonvolatile memory unit at a memory location based on the memory address information output by the processor.

14. A method according to claim 13 in which the storing into the nonvolatile memory unit comprises conditionally enabling the storing based on the memory address information output by the processor.

15. A method according to claim 14 in which the enabling comprises use of a backup-address register to specify a range of processor memory addresses for which storing into the nonvolatile memory unit is enabled.

16. A method according to claim 15 in which the use of the backup-address register comprises enabling the backup-address register to be loaded with a value based on the write data information of the processor, the enabling being based on the memory address information output by the processor.

17. A method according to claim 10 in which the retrieving comprises retrieving the read data information of the volatile memory unit from the memory array of the volatile memory unit at a memory location based on the address output by the processor.

18. A method according to claim 10 in which the retrieving comprises retrieving the read data information of the nonvolatile memory unit from the memory array of the nonvolatile memory unit at a memory location based on the address output by the processor.

19. A method according to claim 10 in which the retrieving comprises:

retrieving the read data information of the nonvolatile memory unit from the memory array of the nonvolatile memory unit at a memory location based on the address output by the processor; and storing the read data information of the nonvolatile memory unit into the memory array of the volatile memory unit at a memory location based on the memory address information output by the processor.

20. A memory device comprising:

a memory array;

a logic circuit for controlling data storage and retrieval to and from the memory array;

a first signal path via which a first set of signals communicating memory address, write data, and control information are input to the memory device and via which a second set of signals communicating read data information are output from the memory device;

a second signal path via which a third set of signals communicating the memory address, the write data, and the control information are output from the memory device without communicating through the memory array and via which a fourth set of signals communicating the read data information are input to the memory device without communicating through the memory array;

the memory array and logic circuit both integrated within the memory device and the first and second signal paths comprising external interfaces on the memory device, and data bits representing the memory address information are directly communicated from the first signal path to the second signal path without communicating through the logic circuit;

wherein the memory device is a volatile memory device, the memory array is a volatile memory array and the logic circuit includes address decode circuitry for decoding memory addresses used for storing and retrieving data in both the volatile memory device and a second non-volatile memory device.

21. The memory device according to claim 20 wherein only address decode circuitry internal to the volatile memory device is used for accessing and decoding memory address locations in both the volatile memory device and the nonvolatile memory device.

22. The memory device according to claim 20 wherein the first signal path is coupled in series between a processor and the volatile memory and the second signal path is coupled in series between the volatile memory and the nonvolatile memory.

23. The memory device according to claim 22 wherein only the first signal path is used by the processor for accessing both the volatile memory and the nonvolatile memory.

24. A memory device comprising:
   a memory array;
   a logic circuit for controlling data storage and retrieval to and from the memory array;
   a first signal path via which a first set of signals communicating memory address, write data, and control information are input to the memory device and via which a second set of signals communicating read data information are output from the memory device;
   a second signal path via which a third set of signals communicating the memory address, the write data, and the control information are output from the memory device without communicating through the memory array and via which a fourth set of signals communicating the read data information are input to the memory device without communicating through the memory array;
   the memory array and logic circuit both integrated within the memory device and the first and second signal paths comprising external interfaces on the memory device, and data bits representing the memory address information are directly communicated from the first signal path to the second signal path without communicating through the logic circuit;
   wherein the write data information is selectively input or not into the memory array, while always being output via the second signal path when a write is to occur to another device connected to the second signal path.

25. A memory device according to claim 24 wherein the logic circuit controls whether the write data information is selectivity input or not.

26. A memory device according to claim 24 wherein the second signal path connects to a nonvolatile memory.

* * * * *